United States Patent [19]
Suzuki et al.

[11] Patent Number: 5,641,968
[45] Date of Patent: Jun. 24, 1997

[54] RADIATION IMAGE STORAGE PANEL AND ITS PREPARATION

[75] Inventors: Hideki Suzuki; Masamitu Nonomura; Yuichi Hosoi, all of Kanagawa, Japan

[73] Assignee: Fuji Photo Film Co., Ltd., Kanagawa, Japan

[21] Appl. No.: 504,668

[22] Filed: Jul. 20, 1995

[30] Foreign Application Priority Data

Jul. 20, 1994 [JP] Japan .................... 6-190887

[51] Int. Cl.$^6$ .................................................. G21K 4/00
[52] U.S. Cl. ....................................................... 250/484.4
[58] Field of Search .......................................... 250/484.4

[56] References Cited

U.S. PATENT DOCUMENTS 5,164,224 11/1992 Kojima et al. .................... 250/484.4

*Primary Examiner*—Carolyn E. Fields
*Attorney, Agent, or Firm*—Sixbey, Friedman, Leedom & Ferguson, P.C.; Gerald J. Ferguson, Jr.

[57] ABSTRACT

A radiation image storage panel having a phosphor layer comprising a stimulable phosphor and a binder, wherein the binder comprises a thermoplastic elastomer having a softening or melting point of 30° to 150° C. and a modulus of elasticity of not more than 0.3 kgf/mm$^2$ is resistant to production of cracks in its repeated use in a radiation image recording and reproducing method.

6 Claims, 1 Drawing Sheet

RADIATION IMAGE STORAGE PANEL AND ITS PREPARATION

FIELD OF THE INVENTION

The present invention relates to a radiation image storage panel using a stimulable phosphor and a process for preparing a radiation image storage panel.

BACKGROUND OF THE INVENTION

As a method replacing a conventional radiography, a radiation image recording and reproducing method utilizing a stimulable phosphor as described, for instance, in U.S. Pat. No. 4,239,968, was proposed and is practically employed. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at a considerably smaller dose, as compared with the conventional radiography using a combination of a radiographic film and radiographic intensifying screen. Further, the radiation image recording and reproducing method using a stimulable phosphor is of great value especially when the method is employed for medical diagnosis.

The radiation image storage panel employed in the above-described method has a basic structure comprising a support and a stimulable phosphor layer provided on one surface of the support. If the phosphor layer is self-supporting, however, the support may be omitted. Further, a transparent protective film of a polymer material is generally provided on the free surface (surface not facing the support) of the phosphor layer to keep the phosphor layer from chemical deterioration or physical shock.

The phosphor layer generally comprises a binder and a stimulable phosphor (in the form of particles) dispersed therein. The stimulable phosphor emits light (gives stimulated emission) when it is exposed to radiation such as X-rays and then excited with an electromagnetic wave (i.e., stimulating rays). Accordingly, the radiation having passed through an object or radiated from an object is absorbed by the stimulable phosphor layer of the panel in proportion to the applied radiation dose, and a radiation image of the object is produced on the panel in the form of a radiation energy-stored latent image. The radiation energy-stored image can be released as stimulated emission by sequentially irradiating the panel with the stimulating rays. The stimulated emission is then photoelectrically detected to give electric signals, so as to reproduce a visible image from the electric signals.

As described hereinbefore, the radiation image recording and reproducing method is a very advantageous radiation image reproducing method. Even in this method, it is desirable to give a reproduced radiation image of an improved quality such as high sharpness and good graininess with high sensitivity. The sensitivity of the radiation image storage panel essentially depends on the total amount of stimulated emission which is produced by the stimulable phosphor contained in the panel. The total amount of stimulated emission depends on the luminance of each stimulable phosphor particle as well as on the total amount of the stimulable phosphor particles contained in the phosphor layer of the panel. If the amount of stimulable phosphor in the phosphor layer is large, a large amount of radiation such as X-rays is absorbed by the phosphor layer, and hence a radiation image is obtained with a high sensitivity and a high graininess. It is also preferred to prepare the phosphor layer as thin as possible. This is because the thin phosphor layer reduces spread of stimulating rays in the phosphor layer by scattering and gives a reproduced radiation image of high sharpness.

U.S. Pat. No. 4,910,407 discloses a compression treatment of a stimulable phosphor layer formed on a support. Thus compressed stimulable phosphor layer contains phosphor particles therein at a density higher than the uncompressed stimulable phosphor layer and shows increased sharpness. However, the compressed stimulable phosphor layer sometimes shows decreased sensitivity and graininess as compared with the uncompressed stimulable phosphor layer, probably because a portion of the phosphor particles are broken down by the compression treatment.

U.S. Pat. Nos. 5,153,078 and 5,164,224 disclose a compression treatment of a stimulable phosphor layer comprising stimulable phosphor particles and a binder of a thermoplastic elastomer having a softening or melting point of 30°–150° C. at a temperature higher than the softening or melting point. Thus compressed stimulable phosphor layer shows increased sharpness with no decrease of graininess.

In the radiation image recording and reproducing method, the radiation image storage panel is repeatedly employed in the steps of radiation of X-rays (recording of radiation image), irradiation of stimulating rays (reading out of the recorded radiation image), and exposure to erasing light (erasure of residual radiation image). Between these steps, the storage panel is transferred by conveyors such as belts and/or rollers within an apparatus for the radiation image recording and reproducing method. It has been now found that the radiation image storage panel having the compressed stimulable phosphor layer is apt to produce therein cracks in its repeated use in the radiation image recording and reproducing system. The production of cracks are still observed even in the compressed stimulable phosphor layer using as thermoplastic elastomer having a softening or melting point of 30°–150° C. as the binder. The radiation image storage panel having a cracked stimulable phosphor layer cannot reproduce a radiation image of high quality because X-rays or stimulating rays impinged on the cracked phosphor layer is scattered on the cracked portion.

SUMMARY OF THE INVENTION

Accordingly, the present invention has an object to provide a radiation image storage panel which is capable of giving a reproduced radiation image of high quality and further which shows high durability in the transferring steps in the radiation image reproducing apparatus.

Further, the invention provides a process for preparing a radiation image storage panel which gives a reproduced radiation image of high quality and shows high durability.

The present inventors have studied on the phenomenon of production of cracks on the stimulable phosphor layer of a radiation image storage panel and found that the cracks are easily produced when the radiation image storage panel is repeatedly bent or repeatedly encounters physical shock in its transfer operation within the radiation image reproducing apparatus. Tension stress produced in the phosphor layer by the bending and physical shock is considered to cause of the production of cracks in the phosphor layer. Based on the finding, the inventors have studied further to look for a binder material which is capable of releasing the tension stress produced in the transfer operation with no adverse effect in respect of the quality of radiation image to be obtained using the radiation image storage panel.

The present invention resides in a radiation image storage panel having a phosphor layer comprising a stimulable phosphor and a binder, wherein the binder comprises a thermoplastic elastomer having a softening or melting point of 30° to 150° C. and a modulus of elasticity of not more than 0.3 kgf/mm$^2$.

The softening or melting point is equivalent to a Vicat softening point defined in ASTM D 1525.

The radiation image storage panel of the invention preferably comprises a support and the phosphor layer using the above binder polymer, which is prepared by the steps of:

coating on a temporary support a phosphor layer-forming coating dispersion which contains a stimulable phosphor and a binder comprising a thermoplastic elastomer having a softening or melting point of 30° to 150° C. and a modulus of elasticity of not more than 0.3 kgf/mm$^2$ in a solvent to prepare a phosphor sheet;

separating the phosphor sheet from the temporary support; and fixing the phosphor sheet onto the permanent support under a pressure of not lower than 50 kw/cm$^2$ and at a temperature higher than the softening or melting point of the thermoplastic elastomer by 10° to 50° C.

The preferred embodiments of the radiation image storage panel of the invention are described below:

The radiation image storage panel wherein the modulus of elasticity of the thermoplastic elastomer is in the range of 0.001 to 0.1 kgf/mm$^2$.

The radiation image storage panel wherein the thermoplastic elastomer has a tensile strength in the range of 0.1 to 20 kgf/mm$^2$.

The radiation image storage panel wherein the thermoplastic elastomer has a tensile elongation in the range of 10 to 2,000%.

The radiation image storage panel which further may have a protective layer and a cushioning layer showing an elongation at rupture of the cushioning layer is not less than 100% between the protective layer and the phosphor layer. The cushioning layer preferably is a layer comprising a polyurethane resin and shows an elongation at rupture in the range of 100 to 2,000%, preferably 300 to 2,000%.

DETAILED DESCRIPTION OF THE INVENTION

Figure 1:
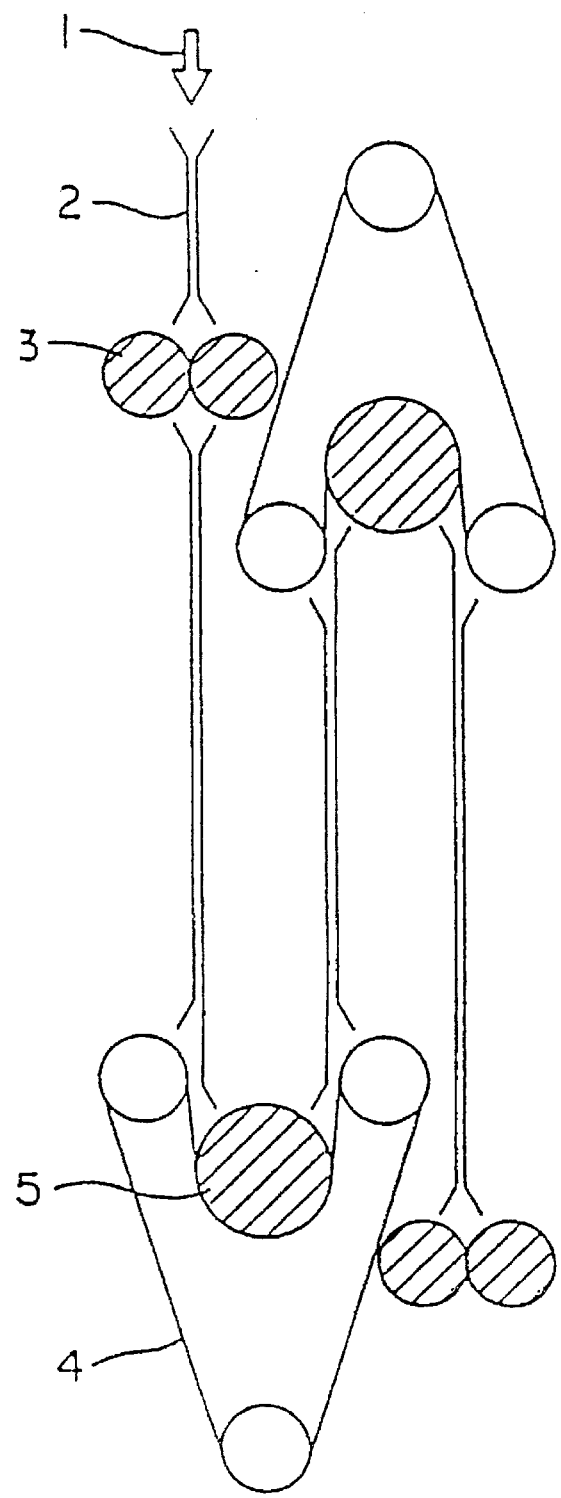
FIG. 1 shows a schematic view of an apparatus for evaluating transfer durability of a radiation image storage panel.

The radiation image storage panel of the invention comprises a stimulable phosphor in the form of particles and a binder. The characteristic feature of the radiation image storage panel of the invention resides in the use of the specifically defined thermoplastic elastomer.

The radiation image storage panel of the invention and the process for its preparation are described below.

The stimulable phosphor gives a stimulated emission when it is irradiated with stimulating rays after it is exposed to radiation. In the preferred radiation image storage panel, a stimulable phosphor giving a stimulated emission of a wavelength in the range of 300 to 500 nm when it is irradiated with stimulating rays of a wavelength in the range of 400 to 900 nm is employed. Examples of the preferred stimulable phosphors include divalent europium activated alkaline earth metal halide phosphors and a cerium activated alkaline earth metal halide phosphors. Both stimulable phosphors favorably give the stimulated emission of high luminance. However, the stimulable phosphors employable in the radiation image storage panel of the invention are not limited to the above-mentioned preferred stimulable phosphors.

The binder polymer to be used for the preparation of the stimulable phosphor layer of the invention is a thermoplastic elastomer having a softening or melting point of 30° to 150° C. and a modulus of elasticity of not more than 0.3 kgf/mm$^2$, preferably in the range of 0.001 to 0.1 kgf/mm$^2$.

Representative examples of the thermoplastic elastomers of the invention include polystyrene, polyolefin, polyurethane, polyester, polybutadiene, ethylene-vinyl acetate copolymer, poly(vinyl chloride), natural rubber, fluorinated rubber, polyisoprene, chlorinated polyethylene, styrene-butadiene rubber, and silicone rubber. It should be understood that the above-described polymers have a great number of variations in respect of their physical and chemical characteristics, and that the thermoplastic elastomer employable in the invention is selected under the condition that the elastomer has a softening or melting point of 30° to 150° C. and a modulus of elasticity of not more than 0.3 kgf/mm$^2$.

In the radiation image storage panel of the invention, the thermoplastic elastomer can be employed singly as the binder. Otherwise, the thermoplastic elastomer can be employed in combination with other polymers, under the condition that the thermoplastic elastomer is used at least in an amount of not less than 30 wt. %, preferably not less than 60 wt. %, more preferably not less than 80 wt. %). The other polymer my be thermoplastic polymers or non-thermoplastic polymers, provided that the other polymers are compatible with the thermoplastic elastomer of the invention. Examples of the other polymers employable in combination with the thermoplastic elastomer of the invention include an epoxy resin, an acrylic resin, and a polyimide resin. The epoxy resin is generally employed for keeping the phosphor layer from yellowing.

The stimulable phosphor layer can be prepared in the following manner.

The stimulable phosphor particles and the binder polymer are well mixed in an appropriate solvent to give a coating dispersion in which the phosphor particles are uniformly dispersed in the binder solution. Examples of the solvents for the preparation of a phosphor layer-forming coating dispersion include lower alcohols such as methanol, ethanol, n-propanol, and n-butanol, chlorine atom-containing hydrocarbons such as methylene chloride and ethylene chloride, ketones such as acetone, methyl ethyl ketone, and methyl isobutyl ketone, esters of lower carboxylic acids and lower alcohols such as methyl acetate, ethyl acetate and butyl acetate, ethers such as dioxane, ethylene glycol monoethyl ether, ethylene glycol monomethyl ether, and tetrahydrofuran, and mixtures of two or more of these solvents.

In the coating dispersion, the binder polymer and the stimulable phosphor are introduced generally at a ratio of 1:1 to 1:100 (binder:phosphor, by weight), preferably 1:8 to 1:40 (by weight). The ratio can be varied depending the desired characteristics of the storage panel and natures of the binder polymers and phosphors.

The coating dispersion may contain additives such as a dispersant (which increases dispersibility of the phosphor in the binder polymer solution) and a plasticizer (which increase adhesion between the binder polymer and the phosphor particles in the phosphor layer). Examples of the dispersants include phthalic acid, stearic acid, caproic acid, and hydrophobic surfactants. Examples of the plasticizers include phosphoric acid esters such as triphenyl phosphate, tricresyl phosphate, and diphenyl phosphate, phthalic acid esters such as diethyl phthalate and dimethoxyethyl phthalate, glycolic acid esters such as ethylphthalylethyl glycolate and butylphthalylbutyl glycolate, and polyesters of polyethylene glycol and aliphatic dibasic acids such as polyesters of triethylene glycol and adipic acid and polyesters of diethylene glycol and succinic acid.

The coating dispersion of the phosphor and binder polymer in the solvent is then coated uniformly on a support to form a coated layer on the support. The coating can be performed by known coating means such as doctor blade, roll coater, and knife coater.

The support can be optionally selected from the known materials employed for the conventional radiation image storage panel. Examples of the known materials include films of plastic materials such as cellulose acetate, polyester (e.g., polyethylene phthalate), polyamide, polyimide, cellulose triacetate, and polycarbonate, metal sheets such as aluminum sheet and aluminum alloy sheet, ordinary paper, baryta paper, resin-coated paper, pigment paper containing a pigment (e.g., titanium dioxide), paper sized with polyvinyl alcohol or the like, and sheets of ceramics such as alumina, zirconia, magnesia and titania.

Some of the known radiation image storage panels have various auxiliary layers: for instance, an adhesive layer which is formed of a polymer material such as gelatin or an acrylic resin on the support and which enhances strength between the support and the phosphor layer or increases sensitivity or image quality (e.g., sharpness and graininess) of the obtainable radiation image; a light-reflecting layer of a light reflecting material such as titanium dioxide; and a light-absorbing layer of a light-absorbing material such as carbon black. The radiation image storage panel of the invention may have one or more of such auxiliary layers.

Further, the support of the radiation image storage panel of the invention may have a great number of very small convexes or concaves on its surface. If the support is coated with one or more auxiliary layers, the convexes or concaves may be formed on these layers. The great number of very small convexes or concaves can improve sharpness of the radiation image reproduced by the use of the storage panel.

The coated phosphor layer is then dried to give the desired stimulable phosphor layer. The stimulable phosphor layer generally has a thickness of 20 μm to 1 mm, preferably 50 to 500 μm. The thickness of the phosphor layer my be varied depending on the characteristics of the radiation image storage panel to be prepared, the natures of the phosphor, and the ratio of the binder polymer to the phosphor.

The coating dispersion of the phosphor layer can be coated on a sheet (i.e., temporary support) other than the support (i.e., permanent support). For instance, the coating dispersion can be coated on a glass sheet, a metal sheet, a plastic sheet or a sheet of other material. The coated phosphor dispersion is dried to give a phosphor layer and then separated from the sheet. The dried phosphor layer (i.e., phosphor sheet) can be used per se with no support, but preferably is fixed onto the permanent support at a pressure of not lower than 50 kgw/cm$^2$, preferably a pressure of 200 to 700 kgw/cm$^2$, and at a temperature higher than the softening or melting point of the thermoplastic elastomer by 10° to 50° C., optionally using an adhesive. The fixing of the phosphor sheet preferably can be conducted using a set of calendar rollers or a hot press. When the calendar rollers are employed, a laminate of the phosphor sheet and a permanent support is passed between a pair of calendar rollers (preferably, set to almost the same temperature) at a rate of 0.1 to 5.0 m/min.

The radiation image storage panel of the invention may have a cushioning layer which is arranged on the stimulable phosphor layer. The cushioning layer can be made of a polymer and shows an elongation at rupture (or elongation at breakage) higher than that of the protective layer coated thereon. The elongation at rupture of the cushioning layer of the invention generally is 100% or more, preferably in the range of 100 to 2,000%, more preferably in the range of 300 to 2,000%, and most preferably in the range of 500 to 2,000%. Further, the elongation at rupture of the cushioning layer is higher (or greater) than that of the coated protective layer generally by not less than 50%, preferably by not less than 100%, more preferably by not less than 300%, and most preferably by not less than 500%. The elongation at rupture can be determined by the known method such as that defined in JIS-K6301.

Examples of the polymer material for the formation of the cushioning layer include polyurethane (typically polyurethane elastomer), polyvinyl chloride (typically polyvinyl chloride elastomer), polyethylene, polypropylene, polyester (typically polyester elastomer), polyamide (typically polyamide elastomer), silicone polymer, polystyrene elastomer, polyolefin elastomer, 1,2-polybutadiene elastomer, ethylene-vinyl acetate elastomer, natural rubber elastomer, polyisoprene elastomer, chlorinated polyethylene elastomer, and silicone elastomer. The cushioning layer of the invention can be prepared using one or more of these polymer materials to satisfy the required elongation at rupture. Preferred are polyurethane elastomer, polyester elastomer, and chlorinated polyethylene elastomer. Most preferred is polyurethane elastomer.

The cushioning layer can be prepared by the steps of preparing a cushioning layer-forming coating solution by dissolving one or more polymers selected from the above-mentioned polymers in an appropriate solvent, coating the coating solution uniformly on the phosphor layer, and drying the coated solution.

The cushioning layer preferably has a thickness in the range of 0.1 to 50 μm, more preferably 0.5 to 20 μm.

The formation of the cushioning layer is preferably done simultaneously with the formation of the stimulable phosphor layer by a simultaneous coating method.

On the stimulable phosphor layer, optionally via the cushioning layer, can be coated a protective layer.

The protective layer of the radiation image storage panel of the invention is made of an organic polymer soluble in an organic solvent. Examples of the organic polymers include fluororesins, acrylic resins such as polymethyl methacrylate, cellulose derivatives such as nitrocellulose, acetylcellulose and cellulose butyrate, polyurethane resins, polyester resins, polyvinyl butyral resin, polycarbonate and epoxy resins.

The protective layer is preferably made of a fluororesin (namely, a fluorine atom-containing resin). The fluororesin is a homopolymer of a fluorine atom-containing olefin or a copolymer of a fluorine atom-containing olefin and other monomer. Examples of the fluororesins include polytetrafluoroethylene, polychlorotrifluoroethylene, polyfluorinated vinyl, polyfluorinated vinylidene, tetrafluoroethylene-hexafluoropropylene copolymer, and fluoroolefin-vinyl ether copolymer. Most of the fluororesins are insoluble in organic solvents. However, copolymers of the fluoroolefin and comonomer can be made soluble in a certain organic solvent if an appropriate comonomer is chosen. Therefore, such soluble fluororesins can be dissolved in an appropriate organic solvent to prepare a coating solution. The coating solution of the fluororesin is coated on the cushioning layer and dried to give a coated protective layer of the fluororesin. Further, if an appropriate fluorine atom-containing organic solvent such as a perfluoro solvent is chosen, polytetrafluoroethylene and its modified polymer can be soluble in the chosen solvent. The prepared solution can be coated on the cushioning layer in the same manner as above to form the coated protective layer.

The above-mentioned fluororesins can be employed singly or in combination with other fluororesins or polymers other than the fluororesins to form the protective layer. However, if the protective layer should have enough anti-staining properties, the protective layer should contain the fluororesin at least 30 weight %, preferably at least 50 weight %, more preferably not less than 70 weight %.

The protective layer of the fluororesin is preferably crosslinked to increase strength and durability of the protective layer. Accordingly, the protective layer-forming coating solution can further contain a crosslinking agent. An anti-yellowing agent can be also incorporated into the coating solution.

The protective layer can be formed by coating on the phosphor layer a protective layer-forming coating solution which contains an organic polymer dissolved in an organic solvent, and drying the coated layer. Otherwise, the protective layer and the cushioning layer can be formed simultaneously by the simultaneous coating method as described above.

The protective layer generally has a thickness in the range of 0.5 to 20 μm, preferably in the range of 1 to 10 μm.

The radiation image storage panel of the invention can be prepared by the above-described process. However, the radiation image storage panel can be modified in the known manners. For instance, one or more layers of constituting the radiation image storage panel can be so colored as to well absorb the stimulating rays and not to absorb the stimulated emission. Such coloring sometimes is effective to increase sharpness of the image obtained by the use of the storage panel. Otherwise, an independent colored layer can be placed in an appropriate position of the storage panel for the same purpose.

Examples embodying the present invention are given below.

EXAMPLE 1

[Preparation of Stimulable Phosphor Layer]

Composition

| | |
|---|---|
| Stimulable phosphor ($BaFBr_{0.85}I_{0.15}:Eu^{2+}$) | 200 g |
| Binder: Polyurethane elastomer (Kramilon U-8165 (solid), Vicat softening point: 69° C., | 8.0 g |

-continued

[Preparation of Stimulable Phosphor Layer]

Composition

| | |
|---|---|
| product of Kuraray Co., Ltd.) | |
| Anti-yellowing agent: Epoxy resin (Epikote 1001 (solid), product of Yuka Shell Epoxy Co., Ltd.) | 2.0 g |

The above composition was placed in methyl ethyl ketone and dispersed by means of a propeller mixer to give a coating dispersion of a viscosity of 30 PS (at 25° C.) in which the ratio of binder to phosphor was 1/20. The dispersion was coated on a polyethylene terephthalate sheet (temporary support, thickness: 180 μm, having a silicone release undercoating) on its undercoating layer side. The coated layer was dried to 100° C. for 15 minutes to give a stimulable phosphor layer, which was then separated from the support to give a stimulable phosphor sheet of a thickness of 320 μm.

[Preparation of Subbing Reflective Layer on Support]

Composition

| | |
|---|---|
| Gadolinium Oxide ($Gd_2O_3$) fine particles (Diameters of 90 wt. % of total particles: within 1–5 μm) | 30 g |
| Polymer: Soft acrylic resin (Cryscoat P-1018GS (20% solution), product of Dai-Nippon Ink Chemical Industries Co., Ltd.) | 30 g |
| Phthalic acid ester | 3.5 g |
| Electroconductive material: ZnO whisker | 10 g |
| Coloring material: ultramarine blue | 0.4 g |

The above composition as placed in methyl ethyl ketone and dissolved by means of a propeller mixer to give a coating solution for the reflective layer having a viscosity of 10 PS (at 20° C). The coating solution was uniformly coated on a polyethylene terephthalate sheet (thickness: 300 μm, permanent support, placed on a glass plate) using a doctor blade. The coated layer was dried to give a subbing reflective layer of 20 μm thick on the support.

On the subbing layer of the support was placed the stimulable phosphor sheet under pressure and heating. The application of pressure and heating was carried out continuously using a set of calendar rolls at 500 kgw/cm², 90° C. (upper roll), 75° C. (lower roll), and a passage rate of 1.0 m/min. The phosphor sheet and the support were firmly combined after being passed through the calendar rolls to give a composite sheet having 220 μm.

[Preparation of Protective Layer]

Composition

| | |
|---|---|
| Fluororesin: Fluoroolefin-vinyl ether copolymer (Lumiflon LF-504X (40% solution), product of Asahi Glass Co., Ltd.) | 50 g |
| Cross-linking agent: Polyisocyanate (Olester NP 38–70S (70% solution), product of Mitsui-Toatsu Chemicals, Inc.) | 9 g |
| Alcohol modified-silicone (X-22-2809 (66% solution), product of Shin-etsu Chemical Industries Co., Ltd.) | 0.5 g |
| Catalyst: dibutyltin dilaurate | 3 mg |

The above composition was placed in methyl ethyl ketone and dissolved to give a coating solution of a viscosity in the range of 0.2 to 0.3 PS (at 25° C.). The coating solution was coated on the stimulable phosphor layer using a doctor blade. The coated layer was dried to 120° C. for 30 minutes for heat-curing to give a protective layer of 3 μm thick.

[Preparation of Edge Coating]

Composition

| | |
|---|---|
| Silicone polymer (polyurethane having polydimethyl siloxane units, Diaromer SP-3023 (15% solution in a mixture of methyl ethyl ketone and toluene, product of Dainichi Seika Co., Ltd.) | 70 g |
| Cross-linking agent: Polyisocyanate (Crossnate D-70 (50 wt. % solution), product of Dainichi Seika Co., Ltd.) | 3 g |
| Anti-yellowing agent: Epoxy resin (Epikote 1001 (solid), product of Yuka Shell Epoxy Co., Ltd.) | 0.6 g |
| Alcohol modified-silicone (X-22-2809 (66% solution), product of Shin-etsu Chemical Industries Co., Ltd.) | 0.2 g |

The above composition was placed in 15 g of methyl ethyl ketone and dissolved to give an edge coating solution. The coating solution was coated on the edges of the above-prepared laminate of a support, a subbing reflective layer, a stimulable phosphor layer and a protective layer, and dried at room temperature to give a cured edge coating layer of 25 μm thick.

Thus, a radiation image storage panel of the invention comprising a support, a subbing reflective layer, a stimulable phosphor layer, a protective layer, and an edge coating was prepared.

EXAMPLE 2

The procedures of Example 1 were repeated except that the stimulable phosphor sheet was prepared in the following manner.

[Preparation of Stimulable Phosphor Layer]

Composition

| | |
|---|---|
| Stimulable phosphor ($BaFBr_{0.85}I_{0.15}$:$Eu^{2+}$) | 200 g |
| Binder: Polyurethane elastomer (P-22 (solid), Vicat softening point: 64° C., product of Nippon Milacton Co., Ltd.) | 8.0 g |
| Anti-yellowing agent: Epoxy resin (Epikote 1001 (solid), product of Yuka Shell Epoxy Co., Ltd.) | 2.0 g |

The above composition was placed in tetrahydrofuran and dispersed by means of a propeller mixer to give a coating dispersion of a viscosity of 30 PS (at 25° C.) in which the ratio of binder to phosphor was 1/20. The dispersion was coated on a polyethylene terephthalate sheet (temporary support, thickness: 180 μm, having a silicone release undercoating) on its undercoating layer side. The coated layer was dried to give a stimulable phosphor layer, which was then separated from the support to give a stimulable phosphor sheet of a thickness of 320 μm.

Thus, a radiation image storage panel of the invention comprising a support, a subbing reflective layer, a stimulable phosphor layer, a protective layer, and an edge coating was prepared.

EXAMPLE 3

The procedures of Example 1 were repeated except for using a polyurethane elastomer of Kuramilon U-3180 (solid, product of Kuraray Co., Ltd.) as the polyurethane elastomer binder for the preparation of the stimulable phosphor sheet to give a radiation image storage panel of the invention comprising a support, a subbing reflective layer, a stimulable phosphor layer, a protective layer, and an edge coating was prepared.

Comparison Example 1

The procedures of Example 1 were repeated except that the stimulable phosphor sheet was prepared in the following manner.

[Preparation of Stimulable Phosphor Layer]

Composition

| | |
|---|---|
| Stimulable phosphor ($BaFBr_{0.85}I_{0.15}$:$Eu^{2+}$) | 200 g |
| Binder: Polyurethane elastomer (Pandex T-5265H (solid), Vicat softening point: 50° C., product of Dainippon Ink & Chemicals Inc.) | 7.1 g |
| Cross-linking agent: Polyisocyanate (Colonate HX (solid), product of Nippon Polyurethane Co., Ltd.) | 0.9 g |
| Anti-yellowing agent: Epoxy resin (Epikote 1001 (solid), product of Yuka Shell Epoxy Co., Ltd.) | 2.0 g |

The above composition was placed in methyl ethyl ketone and dispersed by means of a propeller mixer to give a coating dispersion of a viscosity of 30 PS (at 25° C.) in which the ratio of binder to phosphor was 1/20. The dispersion was coated on a polyethylene terephthalate sheet (temporary support, thickness: 180 μm, having a silicone release undercoating) on its undercoating layer side. The coated layer was dried to give a stimulable phosphor layer, which was then separated from the support to give a stimulable phosphor sheet of a thickness of 320 μm.

Thus, a radiation image storage panel for comparison comprising a support, a subbing reflective layer, a stimulable phosphor layer, a protective layer, and an edge coating was prepared.

Comparison Example 2

The procedures of Example 1 were repeated except that the stimulable phosphor sheet was prepared in the following manner.

[Preparation of Stimulable Phosphor Layer]

Composition

| | |
|---|---|
| Stimulable phosphor ($BaFBr_{0.85}I_{0.15}$:$Eu^{2+}$) | 200 g |
| Binder: Polyurethane elastomer (Desmolac TPKL-5-2625 (solid), Vicat softening point: 60° C., product of Sumitomo Bayer Urethane Co., Ltd.) | 17.8 g |
| Cross-linking agent: Polyisocyanate (Colonate HX (solid), product of Nippon Polyurethane Co., Ltd.) | 0.9 g |
| Anti-yellowing agent: Epoxy resin (Epikote 1001 (solid), product of Yuka Shell Epoxy Co., Ltd.) | 2.0 g |

The above composition was placed in a mixture of methyl ethyl ketone and isopropyl alcohol (1/1, volume ratio) and dispersed by means of a propeller mixer to give a coating dispersion of a viscosity of 30 PS (at 25° C.) in which the ratio of binder to phosphor was 1/20. The dispersion was coated on a polyethylene terephthalate sheet (temporary support, thickness: 180 μm, having a silicone release undercoating) on its undercoating layer side. The coated layer was dried to give a stimulable phosphor layer, which was then separated from the support to give a stimulable phosphor sheet of a thickness of 320 μm.

Thus, a radiation image storage panel for comparison comprising a support, a subbing reflective layer, a stimulable phosphor layer, a protective layer, and an edge coating was prepared.

Elastic Characteristics of Binder Polymer (1) Measurement of Viscoelasticity of Urethane Elastomer Used as Binder of Stimulable Phosphor Layer 1) Preparation of Specimen The urethane elastomer was dissolved in tetrahydrofuran to give a 13 wt. % solution. The solution was coated on a release surface of a base sheet, and dried. The prepared film (thickness: 100 μm) was separated from the base sheet, and cut using a cutter to give a specimen of 5 mm×25 mm (to be gripped at both 5 mm end portions).

2) Measuring Method

A tensile machine (Tensilon UTM-11-20, available from Toyo Boldwin Co., Ltd.) which was designed in accordance with JIS-B-7721 was employed.

The specimen was set between the grips (distance: 15 mm, gripped at both 5 mm end portions) and the grips were separated from each other at a grip separation rate of 40 mm/min. at 25° C., 50% RH under the conditions defined in JIS-K-6251, to measure an S—S curve (Stress-Stretch curve). From the S—S curve, the modulus of elasticity, tensile strength, and tensile elongation were calculated. The results are set forth in Table 1. set forth in Table 1.

TABLE 1

|  | Modulus of Elasticity (kgf/mm²) | Tensile Strength (kgf/mm²) | Tensile Elongation (%) |
|---|---|---|---|
| Example 1 | 0.033 | 2.67 | 865 |
| Example 2 | 0.097 | 6.13 | 780 |
| Example 3 | 0.086 | 7.27 | 790 |
| Com. Ex. 1 | 0.64 | 5.35 | 1038 |
| Com. Ex. 2 | 0.80 | 5.37 | 713 |

Evaluation of Reproduced Radiation Image

The radiation image storage panel was exposed to X-rays at voltage of 80 KVp through an MTF chart and subsequently scanned with a He-Ne laser beam (wavelength: 632.8 nm) to excite the stimulable phosphor. The light emitted by the phosphor layer of the panel was detected and converted to the corresponding electric signals by means of a photosensor and processed to obtain a visible image on a recording apparatus. The modulation transfer function (MTF) value of the visible image was then determined. The MTF value was given as a value(%) at the spacial frequency of 2 cycle/mm. Also measured was graininess (RM) at a radiation amount of 0.1 mR.

As to the sharpness and graininess, the radiation image storage panels prepared in Examples 1 to 3 and Comparison Examples 1 to 2 were at the same levels. This means that the use of the thermoplastic elastomer having a low modulus of elasticity according to the invention gives no adverse influence to the image quality of the reproduced radiation image.

Evaluation of Transferring Durability

The radiation image storage panel was cut to give a test sheet of 100 mm×250 mm, which was then transferred on the transfer test machine illustrated in FIG. 1. The test sheet was introduced from the entrance 1 to pass through the guide plates 2 and nip rolls 3 (diameter: 25 mm). The test sheet was moved on the conveyor belt 4 to successively bend inward and outward along the rubber rolls 5 (diameter: 40 mm) and then was taken out through guide plates and nip rolls. This transferring procedure was repeated up to 5,000 cycles under observation of the production of cracks on the protective layer of the test sheet.

The results are set forth in Table 2.

TABLE 2

|  | Transferring Durability (Cracks on Phosphor Layer) |
|---|---|
| Example 1 | Not observed after 5,000 cycles |
| Example 2 | Not observed after 5,000 cycles |
| Example 3 | Not observed after 5,000 cycles |
| Com. Ex. 1 | Observed at 2,500 cycles |
| Com. Ex. 2 | Observed at 2,000 cycles |

From the results shown in Table 1, it has been confirmed that the radiation image storage panels of the invention using an extremely low modulus of elasticity as the binder polymer for the phosphor layer are resistant to production of cracks in the repeated conveying operation including plural bending procedures and plural physical shocks. In contrast, the known radiation image storage panels show a relatively low resistance because of the high modulus of elasticity.

It was further observed that cracks were produced on the protective layers of the radiation image storage panel for comparison. It appeared that the cracks produced on the stimulable phosphor layer of the radiation image storage panel for comparison brought about cracks on the protective layer which was directly placed on the phosphor layer.

We claim:

1. A radiation image storage panel having a phosphor layer comprising a stimulable phosphor and a binder, wherein the binder comprises a thermoplastic elastomer having a softening or melting point of 30° to 150° C. and a modulus of elasticity of not more than 0.3 kgf/mm².

2. The radiation image storage panel of claim 1, wherein the modulus of elasticity of the thermoplastic elastomer is in the range of 0.001 to 0.1 kgf/mm².

3. The radiation image storage panel of claim 1, wherein the thermoplastic elastomer has a tensile strength in the range of 0.1 to 20 kgf/mm².

4. The radiation image storage panel of claim 1, wherein the thermoplastic elastomer has a tensile elongation in the range of 10 to 2,000%.

5. The radiation image storage panel of claim 1, wherein the thermoplastic elastomer is selected from the group consisting of polystyrene, polyolefin, polyurethane, polyester, polybutadiene, ethylene-vinyl acetate copolymer, poly(vinyl chloride), natural rubber, fluorinated rubber, polyisoprene, chlorinated polyethylene, styrene-butadiene rubber, and silicon rubber.

6. The radiation image storage panel of claim 1, wherein the thermoplastic elastomer is polyurethane elastomer.

* * * * *